(12) United States Patent
Moriya (10) Patent No.: US 12,113,168 B2
(45) Date of Patent: Oct. 8, 2024

(54) SOLID ELECTROLYTE, SECONDARY BATTERY AND CAPACITOR

(71) Applicant: National University Corporation Shizuoka University, Shizuoka (JP)

(72) Inventor: Makoto Moriya, Shizuoka (JP)

(73) Assignee: NATIONAL UNIVERSITY CORPORATION SHIZUOKA UNIVERSITY, Shizuoka (JP)

(*) Notice: Subject to any disclaimer, the term of this patent is extended or adjusted under 35 U.S.C. 154(b) by 189 days.

(21) Appl. No.: 17/800,591

(22) PCT Filed: Feb. 17, 2021

(86) PCT No.: PCT/JP2021/005987
§ 371 (c)(1),
(2) Date: Aug. 18, 2022

(87) PCT Pub. No.: WO2021/166975
PCT Pub. Date: Aug. 26, 2021

(65) Prior Publication Data
US 2023/0343999 A1    Oct. 26, 2023

(30) Foreign Application Priority Data
Feb. 20, 2020    (JP) ................. 2020-027439

(51) Int. Cl.
*H01M 10/0564*    (2010.01)
*H01G 9/028*    (2006.01)

(52) U.S. Cl.
CPC ........ *H01M 10/0564* (2013.01); *H01G 9/028* (2013.01); *H01M 2300/0065* (2013.01)

(58) Field of Classification Search
CPC ........... H01M 10/052; H01M 10/0564; H01M 10/0565; H01M 2300/0065; H01G 11/56
USPC ............................... 252/519.2; 429/300, 482
See application file for complete search history.

(56) References Cited

U.S. PATENT DOCUMENTS

| | | |
|---|---|---|
| 2016/0294004 A1 | 10/2016 | Sasaki et al. |
| 2017/0084949 A1 | 3/2017 | Yokoyama et al. |
| 2020/0343585 A1 | 10/2020 | Miyazaki et al. |
| 2022/0140389 A1 | 5/2022 | Liu et al. |

FOREIGN PATENT DOCUMENTS

| | | | |
|---|---|---|---|
| CN | 103390769 A | 11/2013 | |
| CN | 110071327 A * | 7/2019 | ........ H01M 10/0525 |
| JP | 2008-291046 A | 12/2008 | |
| JP | 2013214510 A * | 10/2013 | |
| JP | 2017/059432 A | 3/2017 | |
| JP | 2017-168371 A | 9/2017 | |
| WO | WO-2011/024848 A1 | 3/2011 | |
| WO | WO-2017/111131 A1 | 6/2017 | |

(Continued)

OTHER PUBLICATIONS

Search Report and Written Opinion in International Application No. PCT/JP2021/005987 dated Apr. 13, 2021, 7 pages.

(Continued)

*Primary Examiner* — Tri V Nguyen
(74) *Attorney, Agent, or Firm* — MARSHALL, GERSTEIN & BORUN LLP (57) ABSTRACT

A solid electrolyte includes a molecular crystal, and an inorganic filler.

11 Claims, 11 Drawing Sheets (56) References Cited

FOREIGN PATENT DOCUMENTS

WO  WO-2019/156158 A1  8/2019

OTHER PUBLICATIONS

International Preliminary Report on Patentability in International Application No. PCT/JP2021/005987 dated Sep. 1, 2021, 8 pages.
Long et al., "Fast Ion Conduction in Molecular Plastic Crystals", Solid State Ionics, vol. 161, 2003, pp. 105-112.
Extended European Search Report in EP Application No. 21755680.2 dated Apr. 15, 2024, 8 pages.

* cited by examiner

SOLID ELECTROLYTE, SECONDARY BATTERY AND CAPACITOR

TECHNICAL FIELD

The present invention relates to a solid electrolyte, a secondary battery and a capacitor.

BACKGROUND ART

In recent years, attempts have been made to apply solid electrolytes to a secondary batteries or the like instead of liquid electrolytes from the viewpoints of reducing the weight of the battery, simplifying the battery structure or the like. For example, inorganic solid electrolytes such as sulfide-based inorganic solid electrolytes and oxide-based inorganic solid electrolytes has been expected to be put into practical use as solid electrolytes such as secondary batteries.

When the inorganic solid electrolyte such as the oxide-based inorganic solid electrolyte is used, there is a problem that it is difficult to adhere to an electrode and the interfacial resistance between the electrode and the inorganic solid electrolyte tends to increase. Therefore, in general, polymer electrolytes easier to adhere to an electrode than the inorganic solid electrolytes has also been considered as solid electrolytes for secondary batteries or the like.

However, the polymer electrolytes have a problem that it is difficult to secure high ionic conductivity.

As described above, in consideration of the problems when the inorganic solid electrolyte and the polymer electrolyte are used alone, it has been considered that the inorganic solid electrolyte and the polymer electrolyte are combined to form a solid electrolyte, or the inorganic solid electrolyte or the polymer electrolyte is composited with another material to form a solid electrolyte.

For example, a method of improving the adhesion between a solid electrolyte layer and an electrode and obtaining high ionic conductivity by providing the solid electrolyte layer including a binder such as a graft polymer or a resin and inorganic solid electrolyte particles has been considered. (see, for example, Patent Document 1).

Further, a pseudo-solid electrolyte including metal oxide particles and an ionic conductive material which is a mixture of an ionic liquid and a lithium salt, in which the ionic conductive material is supported on the metal oxide particles, has been considered (see, for example, Patent Document 2).

Further, a method of producing a solid electrolyte using a coating liquid including an ionic liquid, inorganic oxide particles, and a polymer having a functional group block capable of bonding to the surface of the inorganic oxide particles has been considered (see, for example, Patent Document 3).

PRIOR ART DOCUMENT

Patent Document

[Patent Document 1] International Publication No. 2017/111131
[Patent Document 2] Japanese Patent Application Laid-Open No. 2017-59432
[Patent Document 3] International Publication No. 2011/024848

SUMMARY OF INVENTION

Problems to be Solved by the Invention

For example, when a polymer electrolyte and an oxide-based inorganic solid electrolyte are combined to form a solid electrolyte, the ionic conductivity of the entire solid electrolyte tends to reflect the properties of the polymer electrolyte, which is inferior in ionic conductivity, and there is room for improvement.

The present disclosure has been made in view of the above, the object is to provide a solid electrolyte excellent in flexibility and ionic conductivity, and a secondary battery and a capacitor that include the solid electrolyte.

Means for Solving the Problems

Means for solving the above described problems include the following aspects.

<1> A solid electrolyte including: a molecular crystal, and an inorganic filler.

<2> The solid electrolyte according to <1>, in which the molecular crystal includes at least one molecular crystal selected from the group consisting of $[M_a\{N(SO_2F)_2\}_b X_c]_n$, $[M_a\{N(SO_2CF_3)_2\}_b X_c]_n$, $[M_a\{N(SO_2CF_2)_2CF_2\}_b X_c]_n$ and $[M_a\{N(SO_2C_4F_9)_2\}_b X_c]$, in the at least one molecular crystal, each M independently represents a monovalent to trivalent metal atom, each a independently represents an integer of 1 or more, each b independently represents an integer of 1 or more, each c independently represents an integer of 1 or more, each n independently represents an integer of 1 or more, in each Formula, (valence of M)×a−b=0 is satisfied, and each X independently represents a ligand.

<3> The solid electrolyte according to <1> or <2>, in which the inorganic filler includes an inorganic oxide.

<4> The solid electrolyte according to any one of <1> to <3>, in which a content amount of the inorganic filler is from 1% by mass to 85% by mass with respect to a total amount of the molecular crystal and the inorganic filler.

<5> The solid electrolyte according to any one of <1> to <4>, in which the molecular crystal includes at least one selected from the group consisting of $[LiN(SO_2F)_2(NCCH_2CH_2CN)_2]_n$, $[Li_2\{N(SO_2CF_3)_2\}_2(NCCH_2CH_2CN)_3]_n$, $[Li\{N(SO_2CF_3)_2\}\{(CH_3)_2NCH_2CH_2N(CH_3)_2\}]_n$, $[Li\{N(SO_2CF_2)_2CF_2\}\{(CH_3)_2NCH_2CH_2N(CH_3)_2\}]_n$ and $[Li\{N(SO_2C_4F_9)_2\}\{C_6H_4(OCH_3)_2\}]_n$.

<6> The solid electrolyte according to any one of <1> to <5>, used as a solid electrolyte for a secondary battery or a capacitor.

<7> A secondary battery comprising the solid electrolyte according to any one of <1> to <5>.

<8> A capacitor comprising the solid electrolyte according to any one of <1> to <5>.

Effects of the Invention

According to one aspect of the present invention, a solid electrolyte excellent in flexibility and ionic conductivity, and a secondary battery and a capacitor that include the solid electrolyte can be provided.

DESCRIPTION OF EMBODIMENTS

Hereinafter, the present disclosure will be described in detail.

In a set of numerical ranges that are stated stepwise in the present disclosure, the upper limit value or the lower limit value of a numerical range may be replaced with an upper limit value or a lower limit value of other numerical range. Further, in a numerical range stated in the present disclosure, the upper limit or the lower limit of the numerical range may be replaced with a relevant value indicated in any of Examples.

In the present disclosure, each component may include plural substances corresponding to the component. When the plural substances corresponding to each component are present in a composition, the content ratio or the content amount of each component means the total content ratio or content amount of the plural substances present in the composition unless otherwise specified.

[Solid Electrolyte]

A solid electrolyte includes a molecular crystal, and an inorganic filler. Hereby, the solid electrolyte is excellent in flexibility and ionic conductivity. As the reason, it is assumed that the inclusion of the molecular crystal improves the flexibility of the solid electrolyte, the inclusion of the inorganic filler improves the ionic conductivity and a phenomenon (nanoionics phenomenon), in which ions diffuse at high speed through a space charge layer formed at the interface between the molecular crystal and the inorganic filler, occurs by the composite of the molecular crystal and the inorganic filler, and thereby the ionic conductivity is further improved. Further, in the solid electrolyte of the present disclosure, it is considered that the solid electrolyte can be treated as a pseudo-solid by the composite of the molecular crystal and the inorganic filler even in the temperature range equal to or higher than the melting point of the molecular crystal, and problems such as dissolution and elution of the molecular crystal can be reduced.

The solid electrolyte of the present disclosure may be, for example, used as a solid electrolyte for a secondary battery, a capacitor, or an air battery, or preferably may be used as the solid electrolyte for the secondary battery, or the capacitor.

(Molecular Crystal)

The solid electrolyte of the present disclosure includes the molecular crystal. The molecular crystal is not particularly limited as long as it is a crystal formed by combining a plurality of molecules by interaction between the molecules. It is preferable that the molecular crystal includes an ionic compound including a cation of a monovalent to trivalent metal atom, and an anion, and a ligand of the ionic compound.

Herein, the ligand of the ionic compound may be a ligand coordinated to the ionic compound itself or may be a ligand coordinated to a free cation or a free anion.

The cation of a monovalent to trivalent metal atom in the ionic compound is preferably a cation of at least one metal atom selected from the group consisting of lithium, sodium, potassium, magnesium and aluminum, and more preferably a cation of lithium or sodium.

The anion in the ionic compound is preferably an anion such as $N(SO_2F)_2^-$ (FSA), $N(SO_2CF_3)_2^-$ (TFSA), $N(SO_2C_4F_3)_2^-$ (NFBSA) or the like, and a cyclic anion such as $N(SO_2CF_2)_2CF_2^-$ (CPFSA), $N(SO_2CF_2)_2^-$ or the like.

The ionic compound may be a lithium salt, a sodium salt, a potassium salt, a magnesium salt, an aluminum salt or the like.

The ligand of the ionic compound is not particularly limited as long as it is a compound capable of being a ligand of an ionic compound and forming a molecular crystal and for example, is preferably an organic compound (hereinafter, also referred to as "specific organic compound") including an atom (hereinafter, also referred to as "specific atom") selected from the group consisting of a nitrogen atom, an oxygen atom, a phosphorus atom and a sulfur atom.

The specific atom in the specific organic compound is preferably a nitrogen atom or an oxygen atom. The number of the specific atom in the specific organic compound is preferably 1 to 3, and more preferably 2.

The specific compound is preferably an amine compound, a nitrile compound, an ether compound or a thioether compound, and more preferably a nitrile compound or an ether compound.

The specific organic compound is preferably a compound in which two amino groups, two nitrile groups, two alkoxy groups or two thioalkyl groups are bonded via a divalent linking group. Examples of the amino group include a primary amino group, a secondary amino group and a tertiary amino group. Examples of the divalent linking group include a substituted or unsubstituted alkylene group, a phenylene group and the like.

Specific examples of the specific organic compound are not particularly limited, and examples thereof include N,N,N',N'-tetramethylethylenediamine, N,N,N',N'-tetraethylethylenediamine, N,N,N',N'-tetramethyl-1,2-diaminopropane, N,N,N',N'-tetramethyl-1,3-diaminopropane, N,N,N',N'-tetramethyl-1,3-diamino butane, malononitrile, succinonitrile, glutaronitrile, adiponitrile, dimethylmalononitrile, tetramethylsuccinonitrile, 1,1,3,3-propanetetracarbonitrile, 1,2,2,3-propanetetracarbonitrile, 1,2,3-propanetricarbonitrile, 1,3,5-cyclohexanetricarbonitrile, 1,2-dimethoxybenzene, 1,3-dimethoxybenzene and 1,4-dimethoxybenzene. Among them, from the viewpoint of being superior in the ionic conductivity of the solid electrolyte, N,N,N',N'-tetramethylethylenediamine (($CH_3)_2NCH_2CH_2N(CH_3)_2$), succinonitrile ($NCCH_2CH_2CN$) and 1,2-dimethoxybenzene ($C_6H_4(OCH_3)_2$) are preferable, and from the viewpoint of the ionic conductivity of the solid electrolyte and a reduction in volatilization at high temperature, succinonitrile and glutaronitrile are more preferable.

For example, the boiling point of succinonitrile is 265° C., and the boiling point of glutaronitrile is 287° C., and these boiling points are relatively high. Thereby, since the volatilization of the ligand can be reduced under heating conditions, the solid electrolyte of the present disclosure can be expected to be used in a wide range.

The number of the ligand of the ionic compound may be one or more to one molecule of the ionic compound, is preferably 1 to 3, and from the viewpoint of the ionic conductivity of the solid electrolyte, is more preferably 1 or 2.

The molecular crystal preferably includes at least one molecular crystal (hereinafter, also referred to as "specific molecular crystal") selected from the group consisting of $[M_a\{N(SO_2F)_2\}_b X_c]_n$, $[M_a\{N(SO_2CF_3)_2\}_b X_c]_n$, $[M_a\{N(SO_2CF_2)_2CF_2\}_b X_c]_n$ and $[M_a\{N(SO_2C_4F_9)_2\}_b X_c]$.

Each M independently represents a monovalent to trivalent metal atom, each a independently represents an integer of 1 or more, each b independently represents an integer of 1 or more, each c independently represents an integer of 1 or more, and each n independently represents an integer of 1 or more. However, in each Formula, (valence of M)×a−b=0 is satisfied. Each X independently represents a ligand.

In the specific molecular crystal, M is preferably lithium, sodium, potassium, magnesium or aluminum, and more preferably lithium or sodium.

The preferable configuration of the ligand represented by X is the same as the preferred configuration of the aforementioned ligand of the ionic compound.

The molecular crystal is preferably at least one selected from the group consisting of $[LiN(SO_2F)_2(NCCH_2CH_2CN)_2]_n$, $[Li_2\{N(SO_2CF_3)_2\}_2(NCCH_2CH_2CN)_3]_n$, $[Li\{N(SO_2CF_3)_2\}\{(CH_3)_2NCH_2CH_2N(CH_3)_2\}]_n$, $[Li\{N(SO_2CF_2)_2CF_2\}\{(CH_3)_2NCH_2CH_2N(CH_3)_2\}]_n$ and $[Li\{N(SO_2C_4F_9)_2\}\{C_6H_4(OCH_3)_2\}]_n$. From the viewpoint of being superior in ionic conductivity of the solid electrolyte, the molecular crystal is more preferably $[LiN(SO_2F)_2(NCCH_2CH_2CN)_2]_n$.

In the solid electrolyte of the present disclosure, the content amount of the molecular crystal is preferably from 15% by mass to 99% by mass, more preferably from 70% by mass to 95% by mass, and still more preferably from 80% by mass to 95% by mass, with respect to the total amount of the molecular crystal and the inorganic filler. When the content amount of the molecular crystal is 15% by mass or more, the flexibility of the solid electrolyte tends to be superior, and when the content amount of the molecular crystal is 99% by mass or less, the ionic conductivity of the solid electrolyte tends to be superior.

(Inorganic Filler)

The solid electrolyte of the present disclosure includes an inorganic filler.

Examples of the inorganic filler include inorganic sulfides, inorganic oxides, and inorganic nitrides. The inorganic filler is preferably an inorganic oxide from the viewpoint of being stable when exposed to the atmosphere and easy to handle. The inorganic oxide may be a crushed oxide-based inorganic solid electrolyte described later, or may be, for example, a crushed garnet-type lithium ion conductor.

Examples of the inorganic oxides include particles such as silica ($SiO_2$), alumina ($Al_2O_3$), celia ($CeO_2$), zirconia ($ZrO_2$), titanium oxide ($TiO_2$), barium titanate ($BaTiO_3$), strontium titanate ($SrTiO_3$), calcium titanate ($CaTiO_3$), iron oxide, lead oxide, tin oxide, cerium oxide, calcium oxide, zinc oxide, trimanganese tetraoxide, magnesium oxide, niobium oxide, tantalum oxide, tungsten oxide, antimony oxide, and indium tin oxide (ITO). Among them, the silica particle is preferable from the viewpoint that it can be mixed with the molecular crystal with high uniformity and that even if the solid electrolyte is heated equal to or higher than the melting point of the molecular crystal, the molecular crystal can be prevented from being eluted and separated. The silica particle may be a hydrophilic silica particle or a hydrophobic silica particle.

The average particle size of the inorganic filler (when the inorganic filler is fibrous, average diameter) is not particularly limited, and for example, may be from 1 nm to 500 nm, may be from 3 nm to 300 nm, or may be 5 nm to 150 nm. The average particle size of the inorganic filler can be measured, for example, by using a known particle size distribution measuring device using a laser scattering method. When the average particle size of the inorganic filler is 500 nm or less, the molecular crystal and the inorganic filler can be mixed with high uniformity, and even if the solid electrolyte is heated equal to or higher than the melting point of the molecular crystal, separation due to elution of the molecular crystal is prevented.

The specific surface area of the inorganic filler is not particularly limited, and for example, may be from 3 $m^2/g$ to 450 $m^2/g$, may be from 5 $m^2/g$ to 400 $m^2/g$, or may be from 10 $m^2/g$ to 350 $m^2/g$. The specific surface area of the inorganic filler can be determined by using a BET method for measuring nitrogen adsorption at 77 K.

In the solid electrolyte of the present disclosure, the content amount of the inorganic filler is preferably from 1% by mass to 85% by mass, more preferably from 5% by mass to 30% by mass, and still more preferably from 5% by mass to 20% by mass, with respect to the total amount of the molecular crystal and the inorganic filler. When the content amount of the inorganic filler is 1% by mass or more, the ionic conductivity of the solid electrolyte tends to be superior, and when the content amount of the inorganic filler is 85% by mass or less, the flexibility of the solid electrolyte tends to be superior.

The solid electrolyte of the present disclosure may be include another component other than the molecular crystal or the inorganic filler. Another component is not particularly limited, and examples thereof include gel electrolytes, polymer electrolytes such as polyethylene oxides, organic electrolyte salts such as lithium bis(trifluoromethanesulfonyl) imide, inorganic electrolyte salts such as lithium hexafluorophosphate, sulfide-based inorganic solid electrolytes, oxide-based inorganic solid electrolytes, binders, conductive auxiliary agents, positive electrode active materials, and negative electrode active materials.

The preferable examples of the sulfide-based inorganic solid electrolytes and the oxide-based inorganic solid electrolytes include lithium ion conductive sulfide-based inorganic solid electrolytes, and oxide-based inorganic solid electrolytes described in International Publication No. 2017/111131.

In the solid electrolyte of the present disclosure, the total content amount of the molecular crystal and the inorganic filler may be 20% by mass to 100% by mass, or may be 70% by mass to 95% by mass, with respect to the total amount of the molecular crystal and the inorganic filler.

The secondary battery of the present disclosure includes the afore-mentioned solid electrolyte of the present disclosure. Since the secondary battery of the present disclosure is excellent in the flexibility and the ionic conductivity of the solid electrolyte, it tends to be excellent in output characteristics, operating characteristics at low temperature, and the like.

The type of the secondary battery is not particularly limited, and examples thereof include a lithium ion secondary battery, a sodium ion secondary battery, a potassium ion secondary battery, a magnesium ion secondary battery, and an aluminum ion secondary battery.

It is preferable that the secondary battery of the present disclosure includes a positive electrode including a positive electrode active material, a negative electrode including a negative electrode active material, and the afore-mentioned solid electrolyte provided between the positive electrode and the negative electrode.

The positive electrode includes a positive electrode current collector and a positive electrode mixture layer including the positive electrode active material. The positive electrode can be produced, for example, by forming the positive electrode mixture layer on the positive electrode current collector using a composition including the positive electrode active material. The composition including the positive electrode active material may be a mixture of an organic binder, a solvent, a conductive auxiliary agent, or the like in addition to the positive electrode active material. As the positive electrode current collector, the positive electrode active material, the organic binder, the solvent, the conductive auxiliary agent, and the like, conventionally known materials used for producing a positive electrode can be applied.

The negative electrode includes a negative electrode current collector and a negative electrode mixture layer including the negative electrode active material. The negative electrode can be produced, for example, by forming the negative electrode mixture layer on the negative electrode current collector using a composition including the negative electrode active material. The composition including the negative electrode active material may be a mixture of an organic binder, a solvent, a conductive auxiliary agent, or the like in addition to the negative electrode active material. As the negative electrode current collector, the negative electrode active material, the organic binder, the solvent, the conductive auxiliary agent, and the like, conventionally known materials used for producing a negative electrode can be applied.

The capacitor of the present disclosure includes the afore-mentioned solid electrolyte of the present disclosure. Since the capacitor of the present disclosure is excellent in the flexibility and the ionic conductivity of the solid electrolyte, it tends to be excellent in output characteristics, operating characteristics at low temperature, and the like.

It is preferable that the capacitor of the present disclosure includes a positive electrode including a positive electrode active material, a negative electrode including a negative electrode active material, and the afore-mentioned solid electrolyte provided between the positive electrode and the negative electrode. The positive electrode includes a positive electrode current collector and a positive electrode active material layer, and the negative electrode includes a negative electrode current collector and a negative electrode active material layer. Examples of the positive electrode active material and the negative electrode active material in the capacitor include an activated carbon.

The secondary battery or the capacitor of the present disclosure may have a series laminated structure in which a plurality of configurations including a positive electrode, the solid electrolyte, and a negative electrode are laminated. When the secondary battery or the capacitor of the present disclosure has the series laminated structure, the container or the like can be simplified as compared with the case where the secondary battery or the capacitor using an electrolytic solution has a series structure, and the mass and volume of the system can be reduced.

The use of the solid electrolyte of the present disclosure is not particularly limited, and examples thereof include laptop computers, pen input personal computers, mobile personal computers, electronic book players, mobile phones, mobile faxes, mobile copies, mobile printers, headphone stereos, video movies, liquid crystal televisions, handy cleaners, portable CDs, mini discs, transceivers, electronic notebooks, calculators, memory cards, portable tape recorders, radios, backup power supplies, motors, aircrafts, automobiles, bikes, motorized bicycles, bicycles, lighting equipment, toys, games machines, watches, power tools, strobes, cameras, load leveling power supplies, renewable energy storage power supplies, and medical equipment.

EXAMPLES

Hereinafter, the present disclosure will be described in detail with reference to Examples, but the present disclosure is not limited to these Examples.

Example 1

Fumed silica (AEROSIL (registered trademark) 300, NIPPON AEROSIL CO., LTD.), which is an inorganic filler, was vacuum dried at 100° C. for 24 hours. In an argon atmosphere, vacuum-dried fumed silica and $[Li(FSA)(NCCH_2CH_2CN)_2]_n$ which is a molecular crystal were mixed using a mortar until the appearance became uniform. At this time, the amount of the fumed silica was set to 5% by mass with respect to the total amount of the fumed silica and the molecular crystal. Next, the mixture was heated while stirring at a temperature equal to or higher than the melting point of the molecular crystal using an oil bath. Then, the mixture was allowed to cool to room temperature to produce a solid electrolyte in which the inorganic filler and the molecular crystal were composited.

(Measurement of Ionic Conductivity)

Figure 1:
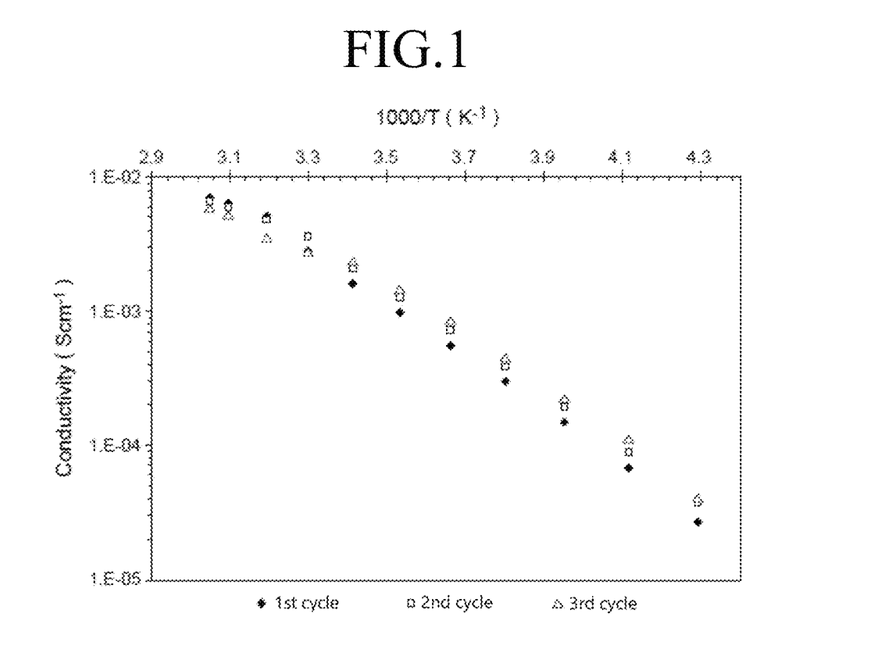
FIG. 1 is measurement results of ionic conductivity in a solid electrolyte of Example 1.

Using the measurement sample obtained by press-molding the solid electrolyte obtained in Example 1 in a disk shape, the ionic conductivity was measured by the AC impedance method using a gold electrode in a closed cell. Further, the ionic conductivity was measured while raising the temperature of the measurement sample in a temperature range equal to or lower than the melting point of the molecular crystal, and the operation was repeated three times. The results are shown in FIG. 1. In FIG. 1, the horizontal axis is 1000/T (T represents the temperature (K)), and the vertical axis is the ionic conductivity (S/cm).

Example 2

A solid electrolyte was produced in the same manner as in Example 1 except that the amount of the fumed silica in Example 1 was changed to 10% by mass with respect to the total amount of the fumed silica and the molecular crystal.

Figure 2:
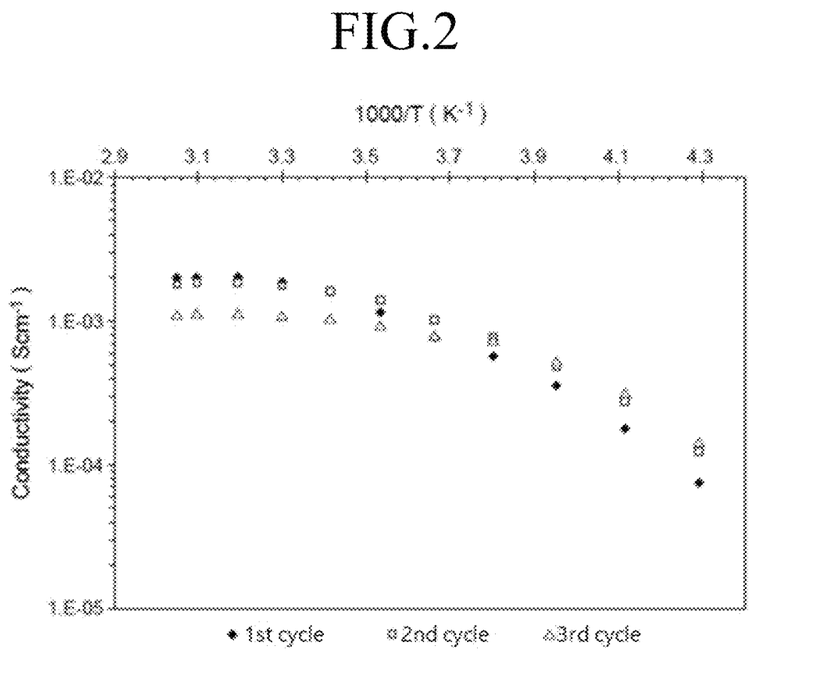
FIG. 2 is measurement results of ionic conductivity in a solid electrolyte of Example 2.

The ionic conductivity of the solid electrolyte was measured in the same manner as in Example 1. The results are shown in FIG. 2.

Example 3

A solid electrolyte was produced in the same manner as in Example 1 except that the amount of the fumed silica in Example 1 was changed to 20% by mass with respect to the total amount of the fumed silica and the molecular crystal.

Figure 3:
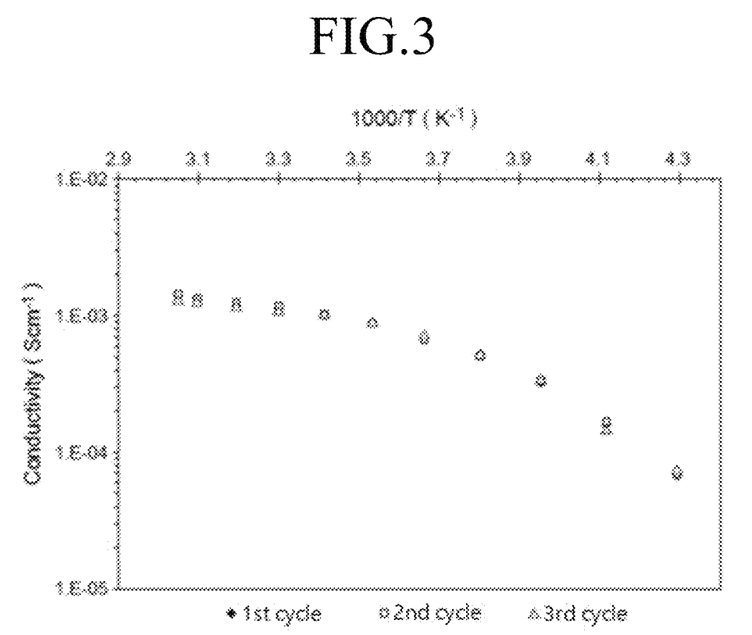
FIG. 3 is measurement results of ionic conductivity in a solid electrolyte of Example 3.

The ionic conductivity of the solid electrolyte was measured in the same manner as in Example 1. The results are shown in FIG. 3.

(Differential Scanning Calorimetry)

Each of solid electrolytes was produced in which the amount of the fumed silica was 0% by mass, 5% by mass, 10% by mass, 15% by mass, 20% by mass, or 30% by mass with respect to the total amount of the fumed silica and the molecular crystal. The differential scanning calorimetry (DSC) was performed on the produced solid electrolyte. Specifically, a differential scanning calorimeter (DSC-60, manufactured by Shimadzu Corporation) was used and the measurement was performed at a heating rate of 10° C. per minute. The results are shown in FIG. 4.

Figure 4:
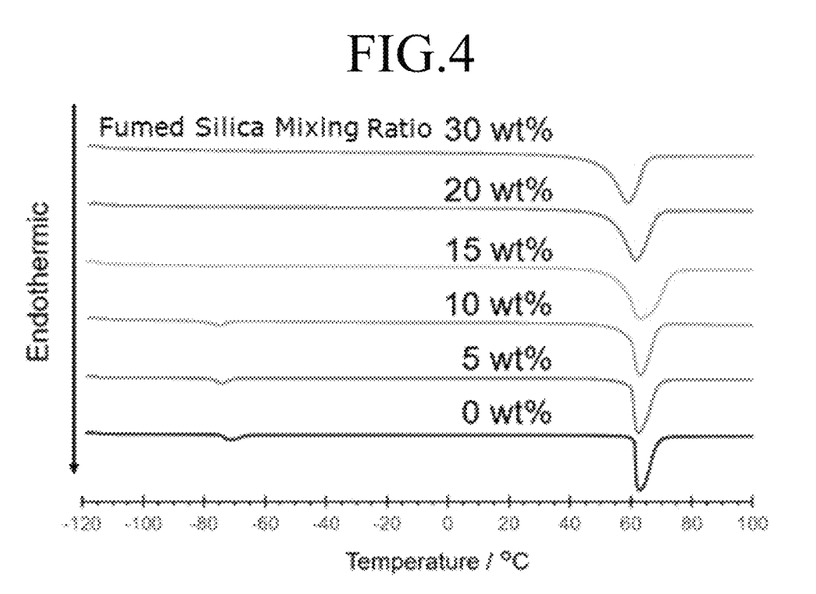
FIG. 4 is results of a DSC measurement in the solid electrolyte in which the amount of the fumed silica was 0% by mass, 5% by mass, 10% by mass, 15% by mass, 20% by mass, or 30% by mass with respect to the total amount of the fumed silica and the molecular crystal.

As shown in FIG. 4, similar heat absorption peaks were confirmed in the solid electrolyte in which the amount of the fumed silica was 0% by mass and each of the solid electrolytes in which the afore-mentioned amount of the fumed silica was used, and it was found that the heat absorption peaks were derived from the molecular crystal.

(Measurement by X-ray Diffractometer)

Figure 5:
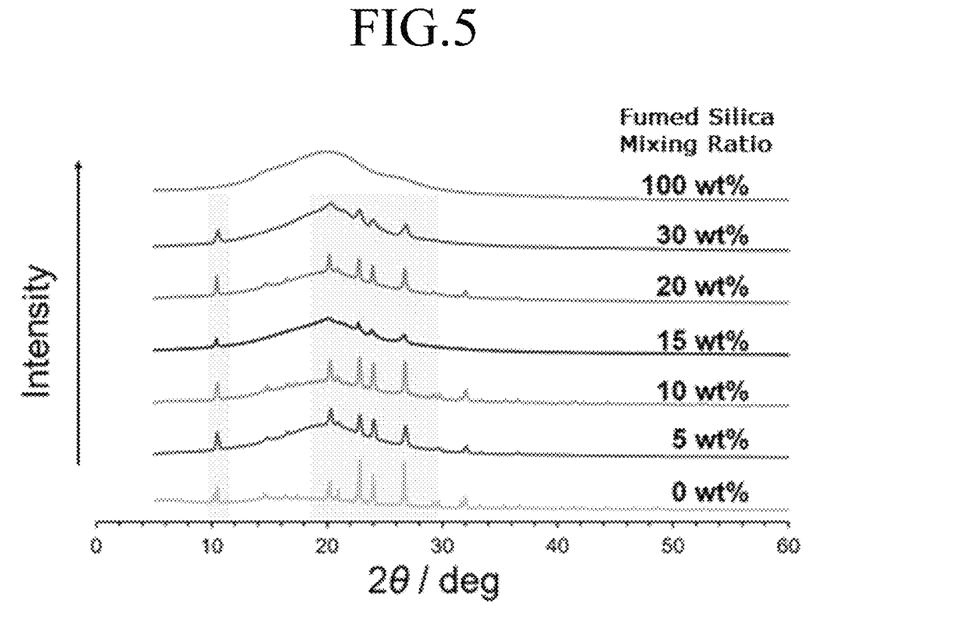
FIG. 5 is results of a XRD measurement in the solid electrolyte in which the amount of the fumed silica was 0% by mass, 5% by mass, 10% by mass, 15% by mass, 20% by mass, 30% by mass or 100% by mass with respect to the total amount of the fumed silica and the molecular crystal.

Each of solid electrolytes was produced in which the amount of the fumed silica was 0% by mass, 5% by mass, 10% by mass, 15% by mass, 20% by mass, 30% by mass, or 100% by mass with respect to the total amount of the fumed silica and the molecular crystal. Regarding the produced solid electrolyte, the measurement was performed by an X-ray diffractometer (XRD). Specifically, an X-ray diffractometer (Rigaku Corporation, fully automatic horizontal multipurpose X-ray diffractometer Smart-Lab) was used, and the measurement was performed under the following conditions. The results are shown in FIG. 5.

X-ray: CuKα ray (wavelength: 1.54 Å)
Output: 40 kV, 30 mA
Scanning speed: 10 deg/min
Step angle: 0.01 deg
Measurement range (2 θ): 5 deg to 60 deg As shown in FIG. 5, since the same peak was confirmed in each of the solid electrolytes including the molecular crystal, it was assumed that the same crystal structure was generated in each of the solid electrolytes.

Example 4

Fumed silica (AEROSIL (registered trademark) 300, NIPPON AEROSIL CO., LTD.), which is an inorganic filler, was vacuum dried at 100° C. for 24 hours. In an argon atmosphere, vacuum-dried fumed silica and $[Li(TFSA)((CH_3)_2NCH_2CH_2N(CH_3)_2)]_n$ which is a molecular crystal were mixed using a mortar until the appearance became uniform. At this time, the amount of the fumed silica was set to 20% by mass with respect to the total amount of the fumed silica and the molecular crystal. Next, the mixture was heated while stirring at a temperature equal to or higher than the melting point of the molecular crystal using an oil bath. Then, the mixture was allowed to cool to room temperature to produce a solid electrolyte in which the inorganic filler and the molecular crystal were composited.

Comparative Example 1

Only $[Li(TFSA)((CH_3)_2NCH_2CH_2N(CH_3)_2)]_n$ which is a molecular crystal was used as a solid electrolyte.
(Measurement of Ionic Conductivity)

Figure 6:
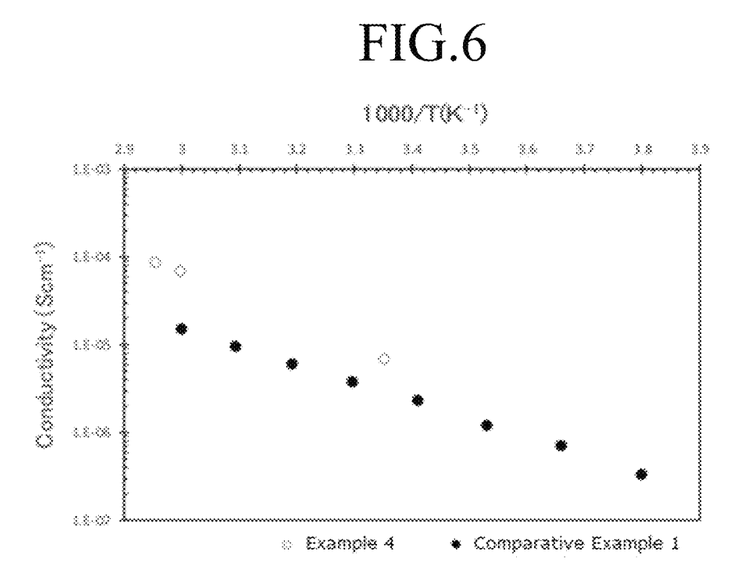
FIG. 6 is measurement results of ionic conductivity in solid electrolytes of Example 4 and comparative Example 1.

Using the measurement sample obtained by press-molding the solid electrolyte obtained in each of Example 4 and Comparative Example 1 in a disk shape, the ionic conductivity was measured by the AC impedance method in a closed cell. The results are shown in FIG. 6 and Table 1. In FIG. 6, the horizontal axis is 1000/T (T represents the temperature (K)), and the vertical axis is the ionic conductivity (S/cm).

Example 5

A solid electrolyte was produced in the same manner as in Example 4 except that $[Li(CPFSA)((CH_3)_2NCH_2CH_2N(CH_3)_2)]_n$ which is a molecular crystal was used instead of $[Li(TFSA)((CH_3)_2NCH_2CH_2N(CH_3)_2)]_n$ which is a molecular crystal.

Figure 7:
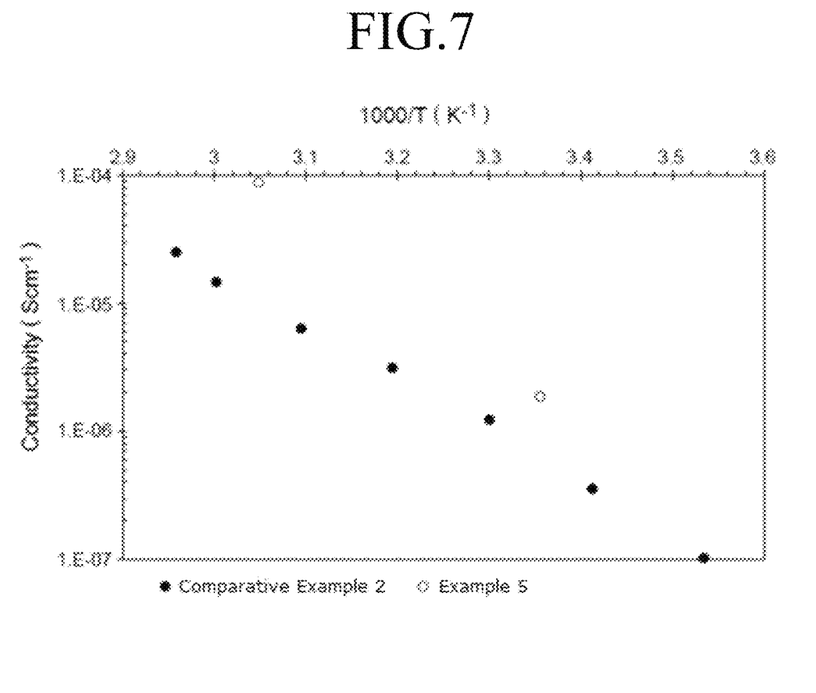
FIG. 7 is measurement results of ionic conductivity in solid electrolytes of Example 5 and comparative Example 2.

The ionic conductivity of the solid electrolyte was measured in the same manner as in Example 4. The results are shown in FIG. 7 and Table 2.

Comparative Example 2

Only $[Li(CPFSA)((CH_3)_2NCH_2CH_2N(CH_3)_2)]_n$ which is a molecular crystal was used as a solid electrolyte.

The ionic conductivity of the solid electrolyte was measured in the same manner as in Example 4. The results are shown in FIG. 7 and Table 2.

Example 6

A solid electrolyte was produced in the same manner as in Example 4 except that $[Li(NFBSA)(C_6H_4(OCH_3)_2)]_n$ which is a molecular crystal was used instead of $[Li(TFSA)((CH_3)_2NCH_2CH_2N(CH_3)_2)]_n$ which is a molecular crystal.

Figure 8:
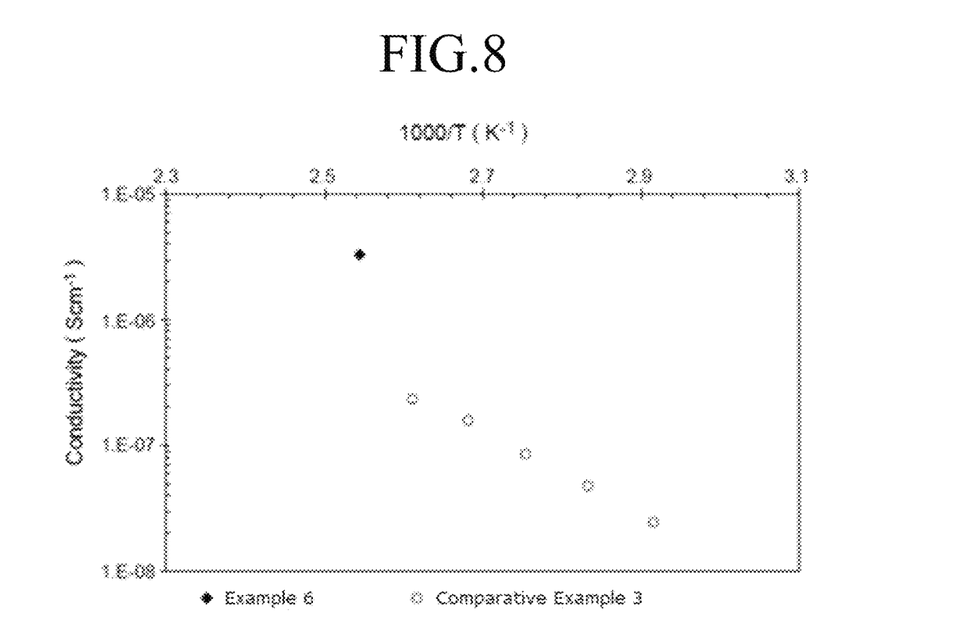
FIG. 8 is measurement results of ionic conductivity in solid electrolytes of Example 6 and comparative Example 3.

The ionic conductivity of the solid electrolyte was measured in the same manner as in Example 4. The results are shown in FIG. 8 and Table 3.

Comparative Example 3

Only $[Li(NFBSA)(C_6H_4(OCH_3)_2)]_n$ which is a molecular crystal was used as a solid electrolyte.

The ionic conductivity of the solid electrolyte was measured in the same manner as in Example 4. The results are shown in FIG. 8 and Table 3.

TABLE 1

| Temperature (° C.) | 1000/T (K) | Example 4 | Comparative Example 1 |
|---|---|---|---|
| −10 | 3.800114 | — | 3.40E−07 |
| 0 | 3.660992 | — | 7.16E−07 |
| 10 | 3.531697 | — | 1.21E−06 |
| 20 | 3.411223 | — | 2.31E−06 |
| 25 | 3.354016 | 6.68E−06 | — |
| 30 | 3.298697 | — | 3.77E−06 |
| 40 | 3.193358 | — | 5.99E−06 |
| 50 | 3.094538 | — | 9.48E−06 |
| 60 | 3.001651 | 6.86E−05 | 1.54E−05 |
| 65 | 2.957267 | 8.56E−05 | — |

TABLE 2

| Temperature (° C.) | 1000/T (K) | Example 5 | Comparative Example 2 |
|---|---|---|---|
| 10 | 3.531697 | — | 1.01E−07 |
| 20 | 3.411223 | — | 3.54E−07 |

TABLE 2-continued

| Temperature (° C.) | 1000/T (K) | Example 5 | Comparative Example 2 |
|---|---|---|---|
| 25 | 3.354016 | 1.89E−06 | — |
| 30 | 3.298697 | — | 1.25E−06 |
| 40 | 3.193358 | — | 3.11E−06 |
| 50 | 3.094538 | — | 6.37E−06 |
| 55 | 3.047387 | 8.82E−05 | — |
| 60 | 3.001651 | — | 1.46E−05 |
| 65 | 2.957267 | — | 2.52E−05 |

TABLE 3

| Temperature (° C.) | 1000/T (K) | Example 6 | Comparative Example 3 |
|---|---|---|---|
| 70 | 2.915452 | — | 2.47E−08 |
| 80 | 2.832861 | — | 4.87E−08 |
| 90 | 2.754821 | — | 8.47E−08 |
| 100 | 2.680965 | — | 1.59E−07 |
| 110 | 2.610966 | — | 2.38E−07 |
| 120 | 2.544529 | 3.21E−06 | — |

As shown in FIGS. 6 to 8 and Tables 1 to 3, the solid electrolytes of Examples 4 to 6 were superior in ionic conductivity to the solid electrolytes of Comparative Examples 1 to 3.

Example 7

Fumed silica (AEROSIL (registered trademark) 300, NIPPON AEROSIL CO., LTD. average particle size 7 nm, specific surface area 300±30 m$^2$/g), which is an inorganic filler, was vacuum dried at 100° C. for 24 hours. In an argon atmosphere, vacuum-dried fumed silica and [Li(FSA)(NCCH$_2$CH$_2$CN)$_2$]$_n$ which is a molecular crystal were mixed using a mortar until the appearance became uniform. At this time, the amount of the fumed silica was set to 20% by mass with respect to the total amount of the fumed silica and the molecular crystal. Next, the mixture was heated while stirring at a temperature equal to or higher than the melting point of the molecular crystal using an oil bath. Then, the mixture was allowed to cool to room temperature to produce a solid electrolyte in which the inorganic filler and the molecular crystal were composited.

Figure 9:
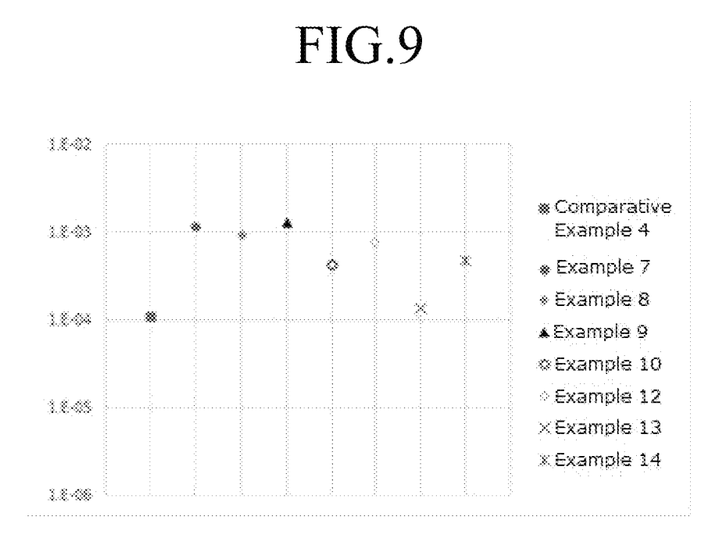
FIG. 9 is measurement results of ionic conductivity in solid electrolytes of Examples 7 to 10 and 12 to 14 and comparative Example 4.
Figure 10:
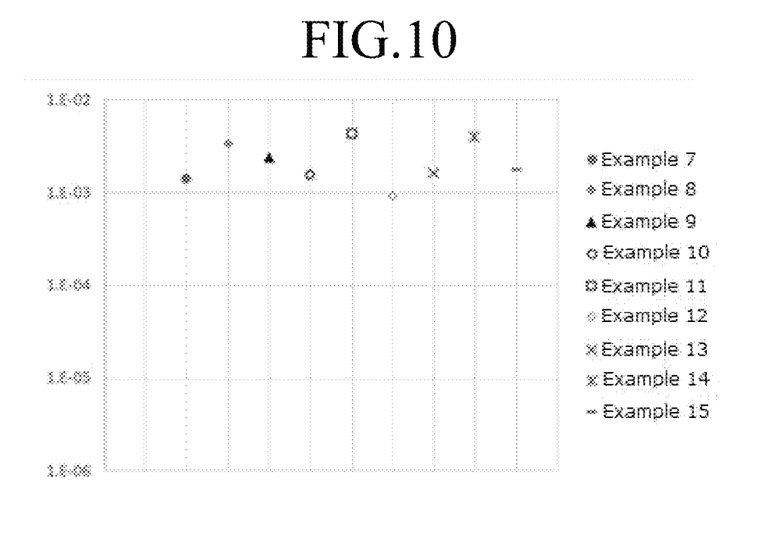
FIG. 10 is measurement results of ionic conductivity at 55° C. in solid electrolytes of Examples 7 to 15.

The ionic conductivity of the solid electrolyte at 30° C. and 55° C. was measured in the same manner as in Example 1. The results are shown in FIGS. 9 and 10.

Example 8

A solid electrolyte was produced in the same manner as in Example 7 except that fumed silica was changed to hydrophobic silica (AEROSIL (registered trademark) 812, NIPPON AEROSIL CO., LTD. average particle size 7 nm, specific surface area 260±30 m$^2$/g), and the ionic conductivity of the solid electrolyte was measured. The results are shown in FIGS. 9 and 10.

Example 9

A solid electrolyte was produced in the same manner as in Example 7 except that fumed silica was changed to aluminum oxide (Sigma-Aldrich Co. LLC, average particle size 13 nm, specific surface area 85 m$^2$/g to 115 m$^2$/g), and the ionic conductivity of the solid electrolyte was measured. The results are shown in FIGS. 9 and 10.

Example 10

A solid electrolyte was produced in the same manner as in Example 7 except that fumed silica was changed to aluminum oxide (Sigma-Aldrich Co. LLC, average particle size less than 50 nm, specific surface area more than 40 m$^2$/g), and the ionic conductivity of the solid electrolyte was measured. The results are shown in FIGS. 9 and 10.

Example 11

A solid electrolyte was produced in the same manner as in Example 7 except that fumed silica was changed to zinc oxide (Sigma-Aldrich Co. LLC, average particle size less than 50 nm, specific surface area more than 10.8 m$^2$/g), and the ionic conductivity of the solid electrolyte was measured. The results are shown in FIG. 10.

Example 12

A solid electrolyte was produced in the same manner as in Example 7 except that fumed silica was changed to zinc oxide (Sigma-Aldrich Co. LLC, average particle size less than 100 nm, specific surface area 10 m$^2$/g to 25 m$^2$/g), and the ionic conductivity of the solid electrolyte was measured. The results are shown in FIGS. 9 and 10.

Example 13

A solid electrolyte was produced in the same manner as in Example 7 except that fumed silica was changed to cerium oxide (Sigma-Aldrich Co. LLC, average particle size less than 25 nm), and the ionic conductivity of the solid electrolyte was measured. The results are shown in FIGS. 9 and 10.

Example 14

A solid electrolyte was produced in the same manner as in Example 7 except that fumed silica was changed to titanium oxide (Kanto Chemical Co., Inc., average particle size 19.7 nm to 101.0 nm, specific surface area 15 m$^2$/g to 77 m$^2$/g), and the ionic conductivity of the solid electrolyte was measured. The results are shown in FIGS. 9 and 10.

Example 15

A solid electrolyte was produced in the same manner as in Example 7 except that fumed silica was changed to titanium oxide (titanium oxide nanowire, Sigma-Aldrich Co. LLC, diameter 10 nm, length 10 μm), and the ionic conductivity of the solid electrolyte was measured. The results are shown in FIG. 10.

Comparative Example 4

Only [Li(FSA)(NCCH$_2$CH$_2$CN)$_2$]$_n$ which is a molecular crystal in Example 7 was used as a solid electrolyte.

The ionic conductivity of the solid electrolyte at 30° C. was measured in the same manner as in Example 7. The results are shown in FIG. 9.

Table 4 shows the results of the ionic conductivity of the solid electrolyte at 30° C. and 55° C. in Examples 7 to 15 and Comparative Example 4. In addition, "−" in Table 4 means that there is no data.

TABLE 4

| | Ionic conductivity of solid electrolyte at 30° C. | Ionic conductivity of solid electrolyte at 55° C. |
|---|---|---|
| Example 7 | 1.15E-03 | 1.41E-03 |
| Example 8 | 9.18E-04 | 3.38E-03 |
| Example 9 | 1.28E-03 | 2.44E-03 |
| Example 10 | 4.23E-04 | 1.60E-03 |
| Example 11 | — | 4.39E-03 |
| Example 12 | 7.57E-04 | 9.42E-04 |
| Example 13 | 1.32E-04 | 1.66E-03 |
| Example 14 | 4.71E-04 | 4.12E-03 |
| Example 15 | — | 1.75E-03 |
| Comparative Example 4 | 1.07E-04 | — |

As shown in FIG. 9, the solid electrolytes of Examples 7 to 10 and Examples 12 to 14 were superior in ionic conductivity at 30° C. to the solid electrolyte of Comparative Example 4.

As shown in FIG. 10, the solid electrolytes of Examples 11 and 15 were superior in ionic conductivity at 55° C. to the solid electrolyte of Example 7, and they had excellent ionic conductivity in a relatively high temperature range.

Further, in Examples 7 to 15, even at 55° C., which is a temperature range equal to or higher than the melting point of the molecular crystal, each of the solid electrolytes could be treated as a pseudo-solid by the composite of the molecular crystal and each of the inorganic fillers, and problems such as dissolution and elution of the molecular crystal could be reduced.

Reference Example 1

Under an argon atmosphere, $Mg(TFSA)_2$ and $NCCH_2CH_2CN$ were mixed under the condition of a molar ratio of 1:3 ($Mg(TFSA)_2:NCCH_2CH_2CN$). Next, the mixture was heated at a temperature equal to or higher than the melting point of $[Mg(TFSA)_2(NCCH_2CH_2CN)_3]_n$ using an oil bath. Then, the mixture was allowed to cool to room temperature to produce a solid electrolyte including $[Mg(TFSA)_2(SN)_3]_n$, which is a molecular crystal.

Reference Example 2

Under an argon atmosphere, $Mg(TFSA)_2$ and $NCCH_2CH_2CH_2CN$ were mixed under the condition of a molar ratio of 1:3 ($Mg(TFSA)_2:NCCH_2CH_2CH_2CN$). Next, the mixture was heated at a temperature equal to or higher than the melting point of $[Mg(TFSA)_2(NCCH_2CH_2CH_2CN)_3]_n$ using an oil bath. Then, the mixture was allowed to cool to room temperature to produce a solid electrolyte including $[Mg_a(TFSA)_b(NCCH_2CH_2CH_2CN)_c]_n$ (estimated structural formula), which is a molecular crystal.

(Measurement of Ionic Conductivity)

Figure 11:
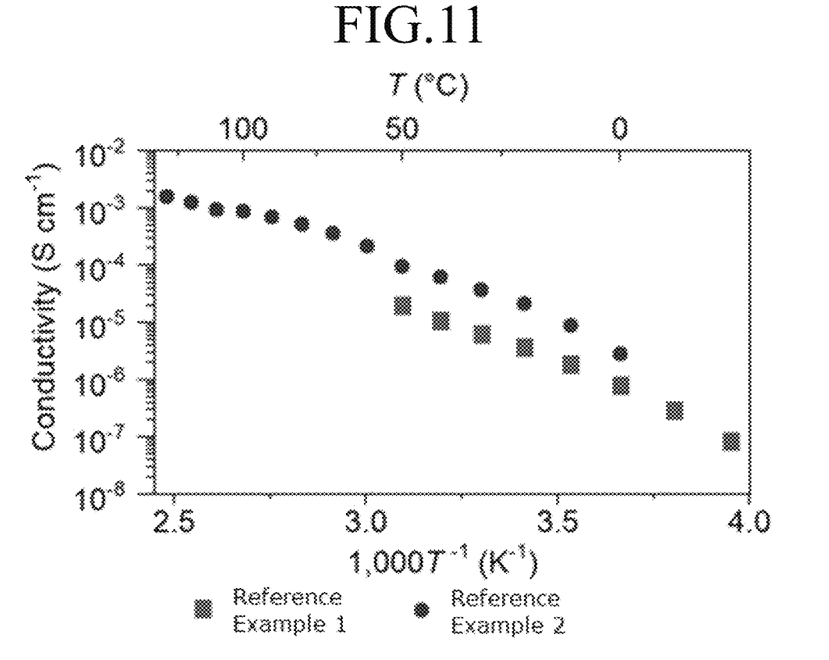
FIG. 11 is measurement results of ionic conductivity in solid electrolytes of Reference Example 1 and Reference Example 2.

Using the measurement sample obtained by press-molding the solid electrolyte obtained in each of Reference Example 1 and Reference Example 2 in a disk shape, the ionic conductivity was measured by the AC impedance method using a gold electrode in a closed cell. Further, the ionic conductivity was measured while raising the temperature of the measurement sample in a temperature range equal to or lower than the melting point of the molecular crystal. The results are shown in FIG. 11.

The present disclosure of Japanese Patent Application No. 2020-027439 filed on Feb. 20, 2020 is herein incorporated by reference in its entity.

All documents, patent applications, and technical standards described herein are herein incorporated by reference, as if each individual document, patent application, and technical standard were specifically and individually indicated to be incorporated by reference.

The invention claimed is:

1. A solid electrolyte comprising:
a molecular crystal, and
an inorganic filler that includes an inorganic oxide,
wherein the molecular crystal includes an ionic compound including a cation of a monovalent to trivalent metal atom, an anion, and a ligand of the ionic compound and the molecular crystal includes at least one selected from the group consisting of $[LIN(SO_2F)_2(NCCH_2CH_2CN)_2]_n$, $[Li_2\{N(SO_2CF_3)_2\}_2(NCCH_2CH_2CN)_3]_n$, $[Li\{N(SO_2CF_3)_2\}\{(CH_3)_2NCH_2CH_2N(CH_3)_2\}]_n$, $[Li\{N(SO_2CF_2)_2CF_2X(CH_3)_2NCH_2CH_2N(CH_3)_2\}]_n$ and $[Li\{N(SO_2C_4F_9)_2HC_6H_4(OCH_3)_2\}]_n$, wherein each n independently represents an integer of 1 or more.

2. The solid electrolyte according to claim 1, wherein the molecular crystal further includes at least one molecular crystal selected from the group consisting of $[M_a\{N(SO_2F)_2\}_bX_c]_n$, $[M_a\{N(SO_2CF_3)_2\}_bX_c]_n$, $[M_a\{N(SO_2CF_2)_2CF_2\}_bX_c]_n$ and $[M_a\{N(SO_2C_4F_9)_2\}_bX_c]$, in the at least one molecular crystal, each M independently represents a monovalent to trivalent metal atom, each a independently represents an integer of 1 or more, each b independently represents an integer of 1 or more, each c independently represents an integer of 1 or more, each n independently represents an integer of 1 or more, in each Formula, (valence of M)×a−b=0 is satisfied, and each X independently represents a ligand.

3. The solid electrolyte according to claim 2, wherein a content amount of the inorganic filler is from 1% by mass to 85% by mass with respect to a total amount of the molecular crystal and the inorganic filler.

4. The solid electrolyte according to claim 1, wherein a content amount of the inorganic filler is from 1% by mass to 85% by mass with respect to a total amount of the molecular crystal and the inorganic filler.

5. The solid electrolyte according to claim 1, wherein a total content amount of the molecular crystal and the inorganic filler is 70% by mass to 95% by mass, with respect to the total amount of the solid electrolyte.

6. The solid electrolyte according to claim 1, wherein the inorganic filler includes particles selected from the group consisting of silica ($SiO_2$), alumina ($Al_2O_3$), celia ($CeO_2$), zirconia ($ZrO_2$), titanium oxide ($TiO_2$), barium titanate ($BaTiO_3$), strontium titanate ($SrTiO_3$), calcium titanate ($CaTiO_3$), iron oxide, lead oxide, tin oxide, cerium oxide, calcium oxide, zinc oxide, trimanganese tetraoxide, magnesium oxide, niobium oxide, tantalum oxide, tungsten oxide, antimony oxide, and indium tin oxide (ITO).

7. A secondary battery comprising the solid electrolyte according to claim 1.

8. A capacitor comprising the solid electrolyte according to claim 1.

9. A secondary battery comprising the solid electrolyte according to claim 2.

10. A secondary battery comprising the solid electrolyte according to claim 4.

11. A capacitor comprising the solid electrolyte according to claim 2.

* * * * *

UNITED STATES PATENT AND TRADEMARK OFFICE
CERTIFICATE OF CORRECTION

PATENT NO. : 12,113,168 B2
APPLICATION NO. : 17/800591
DATED : October 8, 2024
INVENTOR(S) : Makoto Moriya It is certified that error appears in the above-identified patent and that said Letters Patent is hereby corrected as shown below:

In the Claims

At Column 14, Lines 14-15, "$[LIN(SO_2F)_2(NCCH_2CH_2CN)_2]n$," should be
-- $[LiN(SO_2F)_2(NCCH_2CH_2CN)_2]n$, --.

At Column 14, Lines 17-18, "$[Li\{N(SO_2CF_2)_2CF_2X(CH_3)_2NCH_2CH_2N(CH_3)_2\}]n$" should be
-- $[Li\{N(SO_2CF_2)_2CF_2\}\{(CH_3)_2NCH_2CH_2N(CH_3)_2\}]n$ --.

At Column 14, Lines 18-19, "$[Li\{N(SO_2C_4F_9)_2HC_6H_4(OCH_3)_2\}]n$," should be -- and
$[Li\{N(SO_2C_4F_9)_2\}\{C_6H_4(OCH_3)_2\}]n$, --.

Signed and Sealed this
Fifteenth Day of April, 2025

Coke Morgan Stewart
*Acting Director of the United States Patent and Trademark Office*